United States Patent Office 3,292,743
Patented Dec. 20, 1966

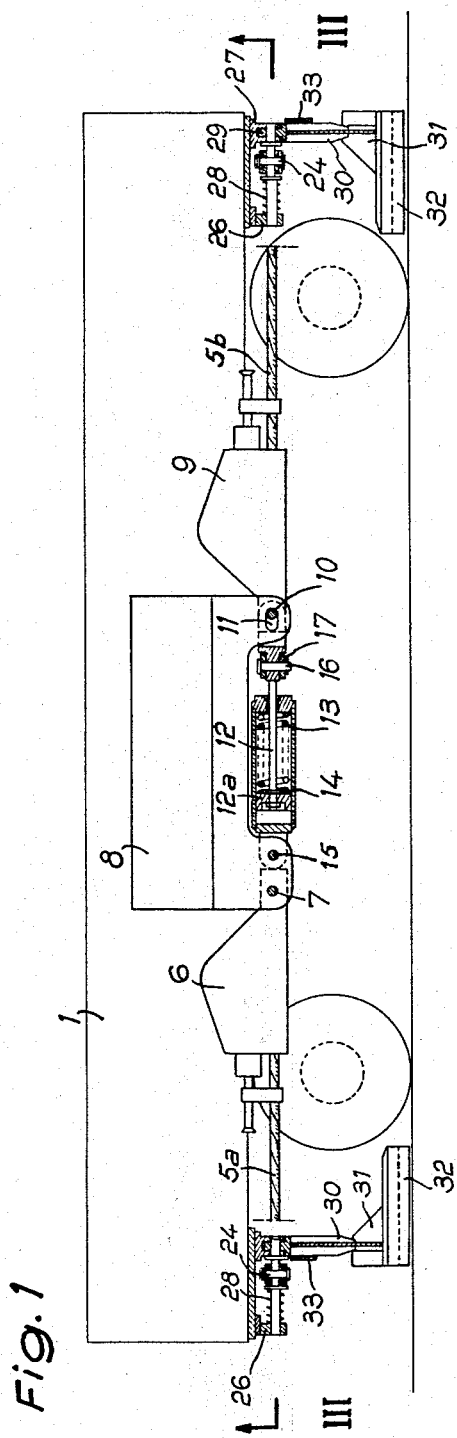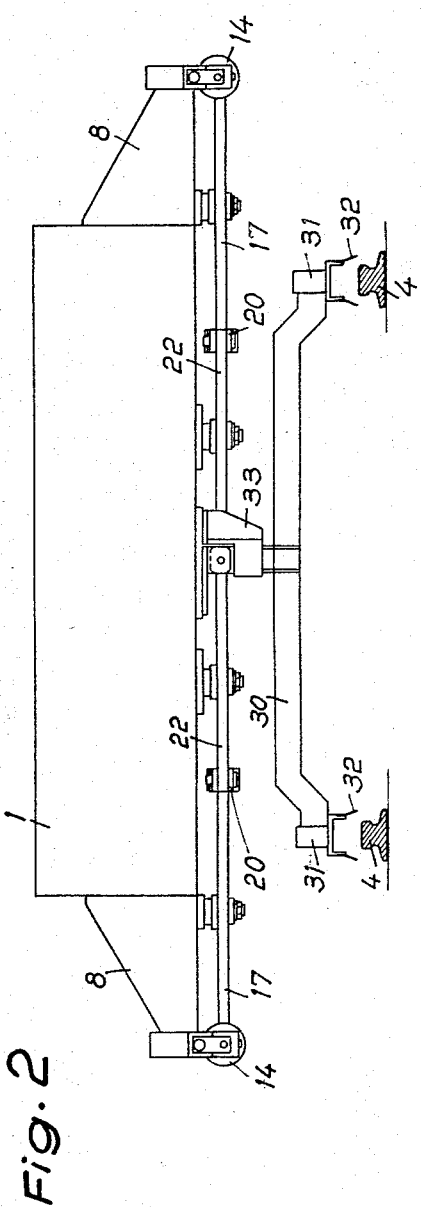

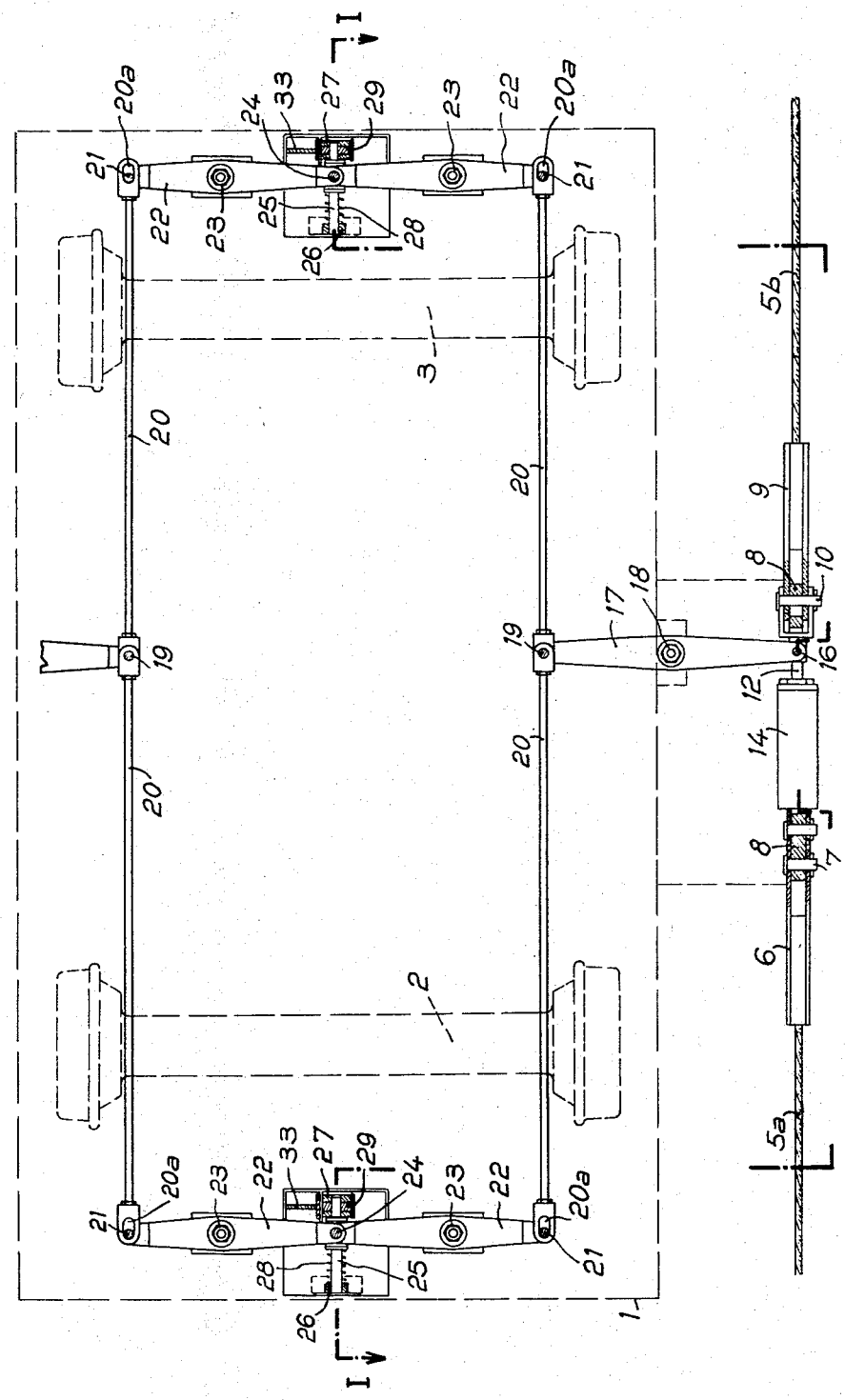

3,292,743
SAFETY BRAKE
Georges Glace, Le Creusot, France, assignor to Societe des Forges et Ateliers du Creusot, Paris, France, a company of France
Filed Sept. 28, 1964, Ser. No. 399,471
Claims priority, application France, Oct. 4, 1963, 949,619
3 Claims. (Cl. 188—127)

This invention has for its subject matter a safety brake, of use more particularly for cable-hauled rail vehicles, the brake providing automatic braking and stoppage of the vehicle if the or any haulage cable breaks.

Cable haulage is normal for rail vehicles such as the trucks which carry slabs and ingots to rolling mills. When loading conditions are such as to require the vehicle to be supplied continuously with electricity, conventional electric or pneumatic or hydraulic brakes can be provided on the vehicle and can readily be arranged to operate in the event of a haulage cable breaking. However, when a continuous electricity supply can be obviated by being provided just at the unloading stations, the braking and stopping of the vehicle are controlled by the or each haulage winch, and a safety brake must be provided which operates in the event of the cable breaking. A braking system using stored energy, such as compressed air, means a cumbersome and complex installation; also, the system is not in regular use and so the braking power may be inadequate at the time of use, so that frequent checks must be made.

The system according to this invention provides braking and stopping by mechanical means not requiring any supply of energy to them, the system using the vehicle's own weight and being able to operate anywhere on the path travelled by the vehicle.

According to the present invention, there is provided a safety brake for cable-hauled rail vehicles, the brake braking and/or stopping the vehicle if the or any of the haulage cables breaks, in which the opposite runs of each haulage cable, the same running over a drive winch system disposed at one end of the path and a reversing wheel disposed at the other end of the path and being pretensioned to a predetermined extent by a tensioning element, are coupled with the vehicle, the one by a stationary coupling member and the other by a moving coupling member urged into engagement with an abutment by the cable tension and against a resilient restoring force, the moving coupling member being mechanically connected to at least one bolt disposed on the vehicle axis, said bolt supporting a cross-member which is disposed near one axle of the vehicle and which has brake shoes adapted to be engaged between the rails and the wheels of the axle by the free fall of the cross member when the bolt is released by the resilient restoring force being rendered operative by the breakage of a cable.

In order that the present invention may be well understood, there will now be described a preferred embodiment thereof given by way of example, with reference to the accompanying diagrammatic drawings in which:

FIGURE 1 is a view of the vehicle in elevation, in partial section along the line II—II of FIGURE 3;

FIGURE 2 is an end view of the vehicle; and

FIGURE 3 is a partial inverted plan view, in partial section along the line III—III of FIGURE 1.

Referring now to the drawings, a vehicle comprising a frame 1 is mounted on two axles 2, 3 and runs on a two-rail track 4. Connected to each side of the vehicle are top-run portions 5a, 5b of a cable which runs over a driving winch (not shown) at one end of the track and over a reversing pulley (not shown) at the other end of the track; a counterweight (not shown) connected to the reversing pulley provides a predetermined pretensioning of the cable. The cable portion 5a has a connector 6 which is pivotally connected to a spindle 7 rigidly secured to a bracket 8 fixed to the frame 1. The cable portion 5b has a connector 9 pivotally connected to a spindle 10 movable in an oblong aperture 11 in the bracket 8. Also articulated to the spindle 10 is one end of a rod 12 having at its other end a disc 12a forming one bearing surface for a spring 13 which bears at its other end against the end of a cylinder 14 articulated to a spindle 15 rigidly secured to the bracket 8. The force of the spring 13 is less than the pretensioning applied to the cable, and the spindle 10 is normally in the end portion shown in FIGURE 1 in the aperture 11.

Pivotally connected to the rod 12 via a spindle 16 is one end of a rocking lever 17 which is rockable around a stationary spindle 18 and whose other end is connected by way of a spindle 19 to two longitudinal rods 20, as can be seen in FIGURE 3. Each rod 20 has its free end connected to a spindle 21 mounted at one end of a rocking lever 22 rockable around a vertical spindle 23; the other end of the rocking lever 22, together with the corresponding end of the rocking lever 22 associated with the cable on the other side of the vehicle, is connected to a spindle 4 borne by a bolt 25 slidable in a guide 26 and in a cover 27 both secured below the frame 1 and biased into engagement with the cover 21 by a spring 28. In the cover 27, the bolt 25 is engaged in a suspension lug 29 for a cross-member 30 bearing, as shown in FIGURE 2, two brake shoes 31 each having lateral guide members 32 for engaging the shoe on the rail 4. The element for connecting each rod 20 to the corresponding rocking lever 22 is formed with an oblong aperture 20a for the spindle 21, so that the corresponding rocking lever 22 is free to move angularly in one direction. As can be seen in FIGURE 1, the two cross-members 30 are arranged to brake the vehicle in both directions of movement; the transverse orientation of each cross-member is effected by a stationary guide 33.

Operation is as follows:

In normal operation each bolt 25 stays engaged in the suspension lug 29 for the corresponding cross-member 30 and the shoes 31 remain slightly above the rails. In the event of a cable breaking, the corresponding return spring 13 becomes predominant and moves the rod 12 which acts, via the rocking lever 17, the two rods 20 connected thereto and the rocking levers 22 connected to the rods 20, to move the two bolts 25; the same each disengage from the corresponding lug 29 to release the two cross-members 30. The brake shoes 31 of whichever cross-member is in front of either of the two axles retards, then stops, the vehicle. The presence of the oblong apertures 20a in the connections between the rods 20 and the rocking levers 22 ensures that, in the event of any cable breaking, both cross-members 30 are released, whatever the state of the other cable may be.

Of course, in the two-cable system disclosed hereby, when either cable breaks the pull applied by the other must cease. To this end, the driving winch system can comprise a differential interconnecting two separate winches for each cable, the differential normally serving to balance the tensions of the two cables.

The safety brake hereinbefore described for two-cable haulage can in a simplified form be used for central single-cable haulage, in which event the moving coupling member acts on a single longitudinal rod connected to the two cross-member suspension bolts to provide a direct release of the cross-members. The safety brake according to the invention is also of use in a vehicle having more than two axles, the cross-members for the brake shoes being disposed near the end axles. In some cases, inter alia where the vehicle axles are close together, the safety brake can be embodied with a single cross-member having two double brake shoes disposed between two adjacent axles of the vehicle.

What I claim is:

1. Safety brake for cable-hauled rail vehicles for stopping the vehicle when a haulage cable breaks comprising at least one haulage cable, a stationary coupling member connecting an end of said cable to the vehicle, a moving coupling member connecting the other end of said cable to the vehicle, an abutment on the vehicle, said moving coupling member being moved into engagement with said abutment by cable tension, a resilient restoring force opposing movement of said moving coupling member, at least one movable bolt disposed on the vehicle axis, mechanical means connecting said moving coupling member to said bolt, a cross-member normally supported by said bolt and brake shoes on said cross-member engaging the rails upon free fall of said cross-member when said bolt is moved by said resilient restoring force upon breakage of said cable.

2. Safety brake as described in claim 1 including two haulage cables, a common actuating linkage connecting said moving coupling members of said two haulage cables for moving two of said bolts, each of said bolts supporting one of said cross-members and each of said cross-members being disposed adjacent an end of the vehicle.

3. Safety brake as described in claim 1 including an actuating linkage for said bolt, said moving coupling members being connected to said linkage, said cross-member having two double brake shoes and being disposed between two adjacent axles of the vehicle.

References Cited by the Examiner

UNITED STATES PATENTS

| 274,144 | 3/1883 | Roland et al. | 188—168 |
| 1,053,775 | 2/1913 | Besta | 188—127 |
| 1,537,541 | 5/1925 | McCarty et al. | 188—36 |
| 2,034,815 | 3/1936 | Huguenin | 188—41 |
| 2,297,589 | 9/1942 | Tackett | 188—168 |

DUANE A. REGER, *Primary Examiner.*